(12) United States Patent
Ito et al.

(10) Patent No.: US 8,259,062 B2
(45) Date of Patent: Sep. 4, 2012

(54) ELECTROPHORETIC DISPLAY DEVICE

(75) Inventors: Hikaru Ito, Kamakura (JP); Hideki Yoshinaga, Yokohama (JP); Hideo Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 723 days.

(21) Appl. No.: 12/180,667

(22) Filed: Jul. 28, 2008

(65) Prior Publication Data

US 2008/0284722 A1  Nov. 20, 2008

Related U.S. Application Data

(63) Continuation of application No. 10/553,264, filed as application No. PCT/JP2005/010737 on Jun. 6, 2005, now Pat. No. 7,423,800.

(30) Foreign Application Priority Data

Jun. 7, 2004 (JP) .................................. 2004-169112

(51) Int. Cl.
*G09G 3/34* (2006.01)
(52) U.S. Cl. ........................................ 345/107; 359/296
(58) Field of Classification Search .................. 345/107, 345/102; 359/296; 204/600
See application file for complete search history.

(56) References Cited

U.S. PATENT DOCUMENTS

| 3,612,758 | A | 10/1971 | Evans et al. ................. 178/5.4 R |
| 5,912,654 | A | 6/1999 | Ouchi et al. ..................... 345/98 |
| 6,482,306 | B1 * | 11/2002 | Yager et al. ................... 204/600 |
| 6,741,386 | B2 * | 5/2004 | Minami ......................... 359/296 |
| 6,922,275 | B2 | 7/2005 | Ikeda ............................ 359/296 |
| 7,358,943 | B2 | 4/2008 | Asao ............................... 345/87 |
| 2003/0030884 | A1 | 2/2003 | Minami ......................... 359/296 |
| 2003/0137521 | A1 | 7/2003 | Zehner et al. ................. 345/589 |
| 2003/0231162 | A1 * | 12/2003 | Kishi ............................ 345/107 |
| 2005/0052402 | A1 * | 3/2005 | Kitano et al. ................. 345/102 |
| 2005/0206995 | A1 | 9/2005 | Ishige .......................... 359/296 |

FOREIGN PATENT DOCUMENTS

| EP | 1 542 067 | 6/2005 |
| JP | 2003114452 A | 4/2003 |
| JP | 2003-330049 A | 11/2003 |
| WO | WO 03/044596 | 5/2003 |
| WO | WO 2004/008239 | 1/2004 |

OTHER PUBLICATIONS

Japanese Office Action dated Sep. 21, 2010, in related Japanese Patent Application No. 2004-169112 (with English translation).

* cited by examiner

*Primary Examiner* — Quan-Zhen Wang
*Assistant Examiner* — Troy Dalrymple
(74) *Attorney, Agent, or Firm* — Fitzpatrick, Cella, Harper & Scinto

(57) ABSTRACT

An electrophoretic display device is constituted by a first substrate and a second substrate which are disposed with a spacing therebetween, a partition wall disposed in the spacing, electrophoretic particles sealed in a closed space defined by the first and second substrates and the partition wall, a first electrode disposed at a side surface of the closed space, and a second electrode disposed at a bottom surface of the closed space. In the electrophoretic display device, a distribution state of the electrophoretic particles is changed to effect display, and the first electrode has an area substantially equal to or larger than an area of the second electrode.

4 Claims, 8 Drawing Sheets

(a)

(b)

ELECTROPHORETIC DISPLAY DEVICE

This is a continuation of application Ser. No. 10/553,264, filed on Oct. 26, 2006, which is a National stage application of PCT/JP2005/010737, filed Jun. 6, 2005.

TECHNICAL FIELD

The present invention relates to an electrophoretic display device.

BACKGROUND ART

By remarkable development of an information technology, an amount of varieties of information in society is increasing significantly.

In connection with this, needs of a display which is one of information output apparatus are increasingly stronger, so that studies on the display with respect to further improvements in definition, power consumption, weight, and thickness have been conducted actively.

In recent years, of these displays which have been researched and developed, electronic paper, which has a display quality equivalent to printed matter and permits electrical writing and flexible portability, has attracted attention. Further, the electronic paper is expected very much also as a means for solving a forest environmental problem which is in currently problematic due to mass consumption of paper. As one of candidates of the electronic paper, an electrophoretic display apparatus has been proposed by Evans et al. in U.S. Pat. No. 3,612,758.

The electrophoretic display apparatus includes an electrophoretic display device constituted by a pair of substrates disposed with a spacing therebetween, an insulating liquid filled in the spacing, colored electrophoretic particles (charged migration particles) dispersed in the insulating liquid, and a display electrode disposed along each of the substrates.

The colored electrophoretic particles are electrically charged positively or negatively, so that they are deposited on either one of the display electrodes depending on a polarity of a voltage applied to the display electrode. For example, the colored electrophoretic particles are deposited on the upper (display) electrode to provide a visible state of the colored electrophoretic particles or on the lower (display) electrode to provide a visible state of the insulating liquid. Thus, display is effected by utilizing a difference in color between the color of the electrophoretic particles and the color of the insulating liquid which has been dyed.

However, in such a conventional electrophoretic display device, when writing only depending on a gradation value (level) on the basis of image data is performed, a desired gradation value display cannot be effected in some cases. This may be attributable to an influence of a DC component remaining in the electrophoretic display device.

Hereinbelow, the influence of the residual DC component will be described.

FIG. 9 shows an embodiment of a structure of a conventional electrophoretic display device.

The electrophoretic display device includes: a dispersion liquid comprising positively charged black electrophoretic particles 11, negatively charged white electrophoretic particles 12, and an insulating liquid in which the black and white electrophoretic particles 11 and 12 are contained; Electrodes, comprising a first electrode 15 and a second electrode 16, for forming an electric field in the dispersion liquid by applying a voltage between the electrodes; an insulating layer 17 for separating the dispersion liquid 10 and the first electrode 15; an insulating layer 18 for separating the dispersion liquid 10 and the second electrode 16; and a partition wall for partitioning adjacent pixels.

In the electrophoretic display device of this type, a relaxation time constant of accumulated electric charges by drive of respective parts is different depending on physical properties of respective constitutional members. In the following description, the relaxation time constant is defined as a product of an electric resistance and an electrostatic capacity (capacitance) of each part when an equivalent electric circuit is considered on the basis of an electric field generated by each part. For example, the relaxation time constant of the dispersion liquid 10 is a product of a resistance and a capacitance of the dispersion liquid 10, thus being in agreement with a product of a volume resistivity and a dielectric constant of the dispersion liquid 10. When charges, such as ions contained in the dispersion liquid 10, accumulate at the insulating layer surface, a time constant at the time of discharging through the dispersion liquid 10 is determined by the above defined relaxation time constant.

When a time constant $\tau 1$ of a dispersion liquid portion and a time constant $\tau 2$ of an insulating layer portion satisfy $\tau 1 \ll \tau 2$, ions are accumulated (deposited) on either one of the upper and lower insulating layer surfaces depending on a polarity thereof in the case of continuously applying a voltage of one polarity, so that the charges are not readily attenuated due to the larger $\tau 2$. As a result, the charges are also left even at both ends, of the insulating layer portion, at which the charges are generally less liable to remain.

In this case, thereafter, even when the voltage applied between the electrodes is made 0 V, the insulating layer portion also has a longer charge relaxation time, thus leaving the charges thereat for a long time. As a result, in spite of the fact that the voltage of 0 V is applied between the electrodes, an internal voltage due to the residual charges is generated upper and lower ends of the dispersion liquid portion. This internal voltage is a residual DC voltage. By the residual DC voltage, a voltage different from the applied voltage is applied between the upper and lower ends of the dispersion liquid portion to cause display image burning (burn-in).

Further, by such a phenomenon, in the case of performing a writing operation by reference to only information on an image to be displayed, a desired voltage cannot be applied to the electrophoretic particles 11 and 12. As a result, a desired display state cannot be obtained. More specifically, in drive of the electrophoretic display device by applying one-polarity voltage, i.e., a positive voltage or a negative voltage, a DC component remains in the electrophoretic display device, so that there arises such a problem that a voltage applied at the time of writing and an effective voltage applied to the electrophoretic particles 11 and 12 are different from each other.

Further, in such a case where the electrophoretic display device is driven to provide a low optical response speed and cause visual recognition of reset display by a user, a base color of the electronic paper is white, so that the electrophoretic display device is strongly required to permit writing from white display reset. However, in the case where the writing from white display reset is performed in a conventional horizontal movement-type electrophoretic display device, a gradation optical level is changed with respect to a minute fluctuation in drive voltage, so that the electrophoretic display device is accompanied with such a problem that gradation control is difficult.

Hereinbelow, the cause of this will be explained. For example, in a conventional horizontal movement-type electrophoretic display device shown in FIG. 10, at the time of white display reset, black electrophoretic particles 11 are deposited in a plurality of layers on a partition wall 7A provided with a first electrode 4A. An interparticular attraction force determined by values of surface energy of the electrophoretic particles 11 and the dispersion liquid 10 is weaker than an attraction force, exerted between the electrophoretic particles 11 and the partition wall 7A, determined by values of surface energy of the electrophoretic particles 11, the dispersion liquid 10, and the partition wall 7A.

Accordingly, the state in which the electrophoretic particles 11 are deposited in the plurality of layers is unstable, so that the deposition state is changed by a slight change in electric field strength (intensity). As a result, an optical response characteristic in writing from white display reset is changed abruptly. In other words, the particles deposited state is changed even by the slight change in electric field strength to unstabilize a resultant optical response characteristic.

DISCLOSURE OF THE INVENTION

A principal object of the present invention is to provide an electrophoretic display device having solved the above described problems.

A specific object of the present invention is to provide an electrophoretic display device capable of alleviating accumulation of residual DC component and stabilizing an optical gradation level in writing from white display reset.

According to an aspect of the present invention, there is provided on an electrophoretic display device, comprising:

a first substrate and a second substrate which are disposed with a spacing therebetween, a partition wall disposed in the spacing, electrophoretic particles sealed in a closed space, defined by the first and second substrates and the partition wall, in which a distribution state of the electrophoretic particles is changed to effect display, a first electrode disposed at a side surface of the closed space, and a second electrode disposed at a bottom surface of the closed space, wherein the first electrode has an area substantially equal to or larger than an area of the second electrode.

In the electrophoretic display device of the present invention, the first electrode disposed at a side surface of the closed space and the second electrode disposed at a bottom surface of the closed space have the substantially same area, whereby it becomes possible to perform such a drive that an opposite polarity voltage is alternately applied between the respective electrodes even in the case of repetitively performing display rewriting, thus alleviating remarkably the accumulation of the residual DC component. Further, by providing the first electrode with a larger area than that of the second electrode, it is possible to stabilize an optical gradation level in writing from white display reset.

These and other objects, features and advantages of the present invention will become more apparent upon a consideration of the following description of the preferred embodiments of the present invention taken in conjunction with the accompanying drawings.

BEST MODE FOR CARRYING TO THE INVENTION

Hereinbelow, embodiments of the electrophoretic display device according to the present invention will be described with reference to the drawings.

First Embodiment

Figure 1:
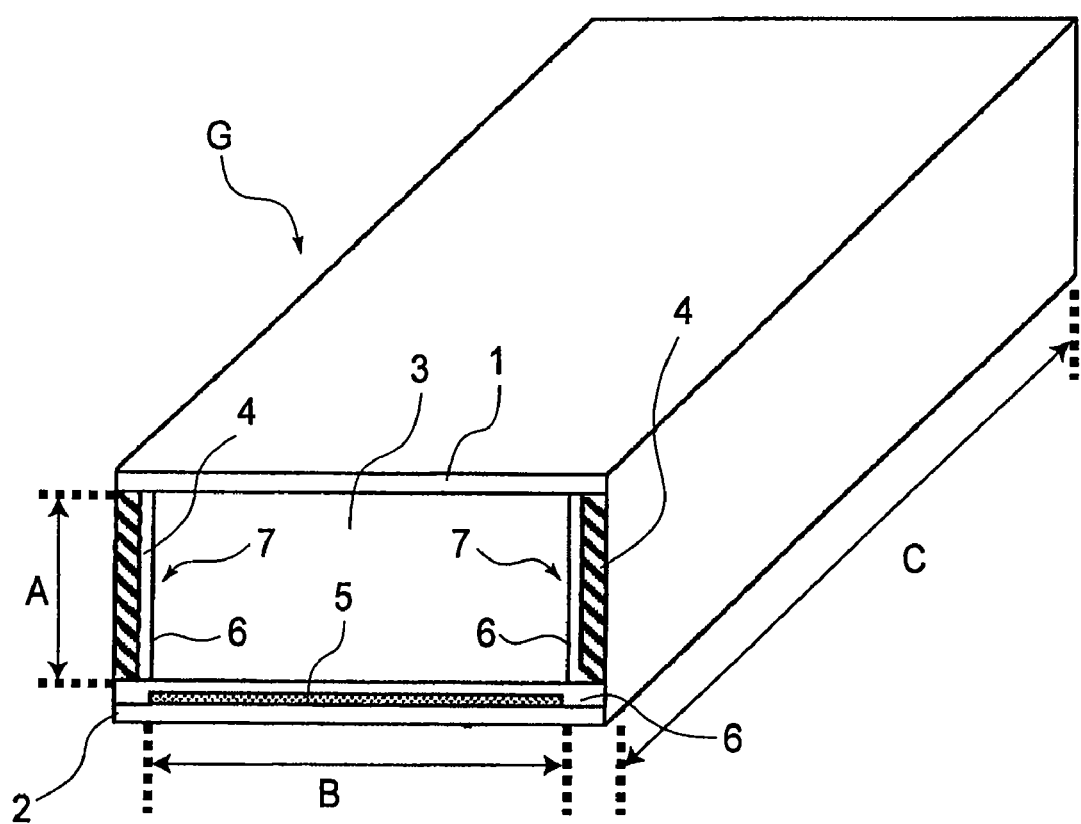
FIG. 1 is a perspective view showing a pixel structure of an electrophoretic display device according to First Embodiment of the present invention.

FIG. 1 is a schematic perspective view showing a pixel structure of an electrophoretic display device according to this embodiment.

Referring to FIG. 1, the electrophoretic display device includes a pixel G, a first substrate 1, a second substrate 2 disposed opposite to the first substrate 1 with a spacing therebetween, a partition wall 7 for keeping the spacing between the first and second substrates 1 and 2 at a predetermined distance and partitioning the pixel and an adjacent pixel, a closed space defined by the first and second substrates 1 and 2 and the partition wall 7, a liquid-phase forming electrophoretic dispersion liquid 3 in which a liquid-phase dispersion medium and charged electrophoretic particles (not shown) dispersed in the dispersion medium are sealed, a second electrode 5 formed on the second substrate 2, and a first electrode 4 formed at a surface of the partition wall 7.

The electrophoretic display device in the embodiment is a matrix panel having 600×1800 pixels. Each pixel G has a height A of 20 μm, a width B of 40 μm, and a length (depth) C of 120 μm. The first electrode 4 is formed at surfaces of a pair of partition wall 7 portions constituting a pair of opposite side surfaces. In this embodiment, two opposite side surfaces of four side surfaces and a bottom surface of the pixel G is coated with the electrodes (the first and second electrodes 4 and 5).

As the second electrode 5, a 1.1 mm-thick glass substrate is used, and the second electrode 5 is disposed at the pixel G. Each of the respective electrodes 4 and 5 is surface-coated with an insulating layer 6. As the electrophoretic particles contained in the electrophoretic dispersion liquid 3 which is sealed in the closed space are black particles. As the dispersion medium contained in the dispersion liquid 3 isoparaffin is used and, as the electrophoretic particles, particles of polystyrene-polymethyl methacrylate copolymer (resin) (particle size: 1-2 μm) containing carbon black are used. At each pixel G, a thin film transistor (TFT) is formed and connected with a voltage application circuit, thus constituting an electrophoretic display apparatus.

Incidentally, in the case where, as shown in FIG. 1, the first and second electrodes 4 and 5 have the same depth dimension (length) C and the first electrode 4 is divided into two portions which are formed at opposite two surfaces of adjacent partition wall portions 7, an area of the first electrode 4 means a sum of areas of these (first electrode) two portions 4.

In this embodiment, the pixel G has a ratio of A (height):B (width) of 1:2, so that the first electrode 4 and the second electrode 5 have the same area.

Figure 2:
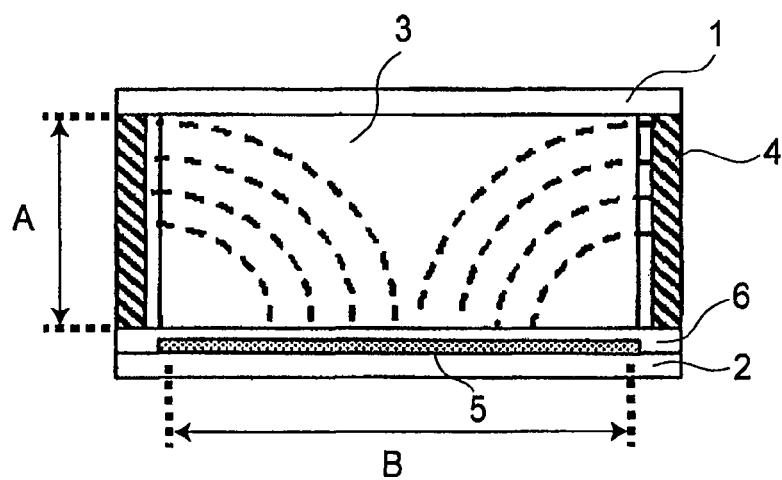
FIGS. 2(*a*) and 2(*b*) are sectional views each showing electric line of force at each pixel of the electrophoretic display device.
Figure 2:
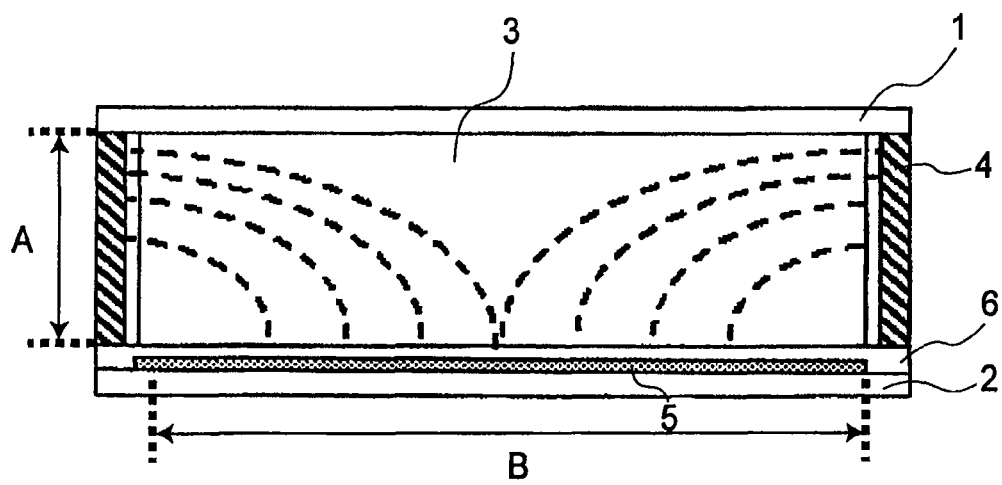

In such a case where the area of the first electrode 4 is equal to the area of the second electrode 5, as shown in FIG. 2(a), a distribution of electric field strength is substantially symmetrical with respect to the electrode surfaces of the first electrode 4 and the second electrode 5. In other words, at the respective electrode surfaces, the electric field strength varies depending on a position and has a distribution but a manner of the distribution from a maximum to a minimum on the first electrode surface is substantially identical to that on the second electrode surface.

More specifically, the electric field strength on the first electrode 4 is stronger with a shorter distance from the first substrate 1 and is weaker with a longer distance from the first substrate 1. On the other hand, the electric field strength on the second electrode 5 is stronger at a portion closer to the partition wall 7 and is weaken at a pixel center portion. The electric field strength is determined by a distance from a bonding (contact) portion of the partition wall 7 and the first substrate 1. Accordingly, as apparent from the ratio A:B of 1:2, the distribution of electric field strength on the first electrode 4 is substantially identical to that on ½ of the entire second electrode 5.

Actually, the first electrode 4 contacts the second substrate 2 but the half of the second electrode 5 is connected with the other half of the second electrode 5. For this reason, the distributions of electric field strength on the first and second electrodes 4 and 5 are not completely identical to each other. Ideally, these distributions are completely identical to each other in such a state that both of the first and second electrodes are extended infinitely. However, by the neglect of a difference in state between the end portion of the first electrode and the center portion of the second electrode, it can be said that both of the electric field strength distributions are substantially identical to each other.

FIG. 2(b) shows a distribution of electric field strength in the case where the area of the first electrode 4 and the area of the second electrode 5 are not equal to each other. In this case, on the first electrode 4, the electric field strength is created relatively uniformly but on the second electrode 5, the electric field strength becomes very small at the center portion of pixel. As a result, distributions of the electric field strengths on the first and second electrodes are not equal to each other.

Figure 3:
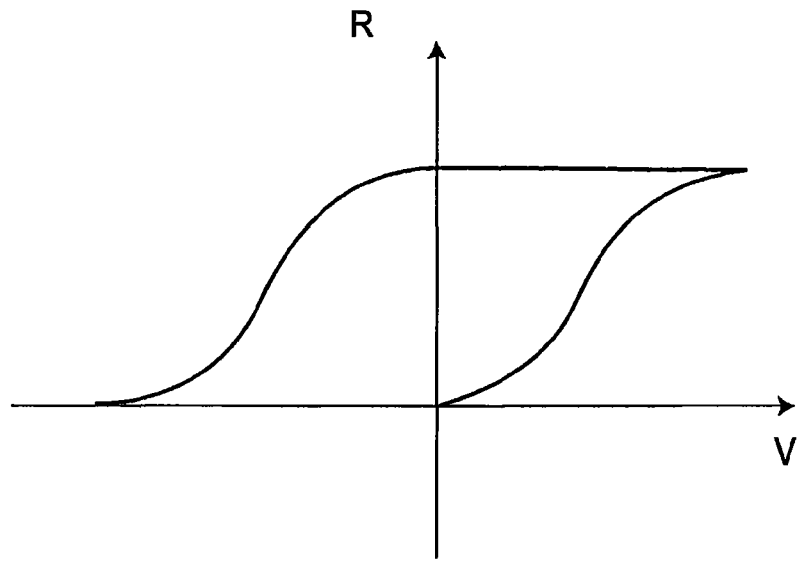
FIGS. 3(*a*) and 3(*b*) are graphs each showing an electrooptical characteristic of the electrophoretic display device.
Figure 3:
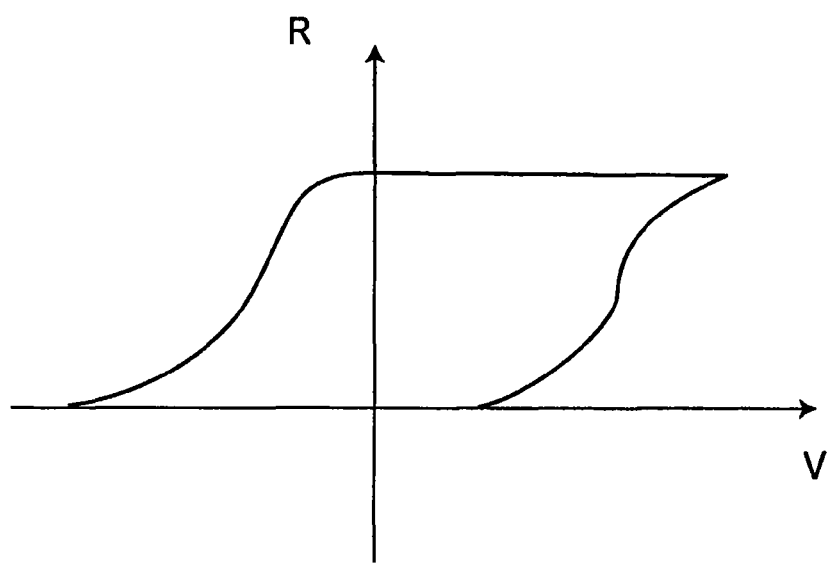

As shown in FIG. 2(a), the distribution of electric field strength to be exerted on the electrophoretic particles is symmetrical with respect to the electrode surfaces of the first and second electrodes, so that a resultant electrooptical characteristic showing a relationship between an optical characteristic (R) and an applied voltage (V) is as shown in FIG. 3(a), thus being improved compared with an electrooptical characteristic in the case of asymmetrical electric field strength distribution (FIG. 2(b)) shown in FIG. 3(b).

Here, in the case of a conventional electrophoretic display device having the electrooptical characteristic shown in FIG. 3(b), there is a considerable difference in optical response characteristic between writing from white display reset and writing from black display reset, so that it is difficult to perform bipolar reset which effects opposite-polarity resets alternately. However, in the case of the electrophoretic-display device of the embodiment having the electrooptical characteristic as shown in FIG. 3(a), the optical response characteristic in writing from white display reset is substantially identical to that in writing from black display reset, so that it is possible to perform reset operation by alternately changing a polarity between a positive side and a negative side at the same voltage amplitude and perform writing at voltages of both of the polarities.

Figure 4:
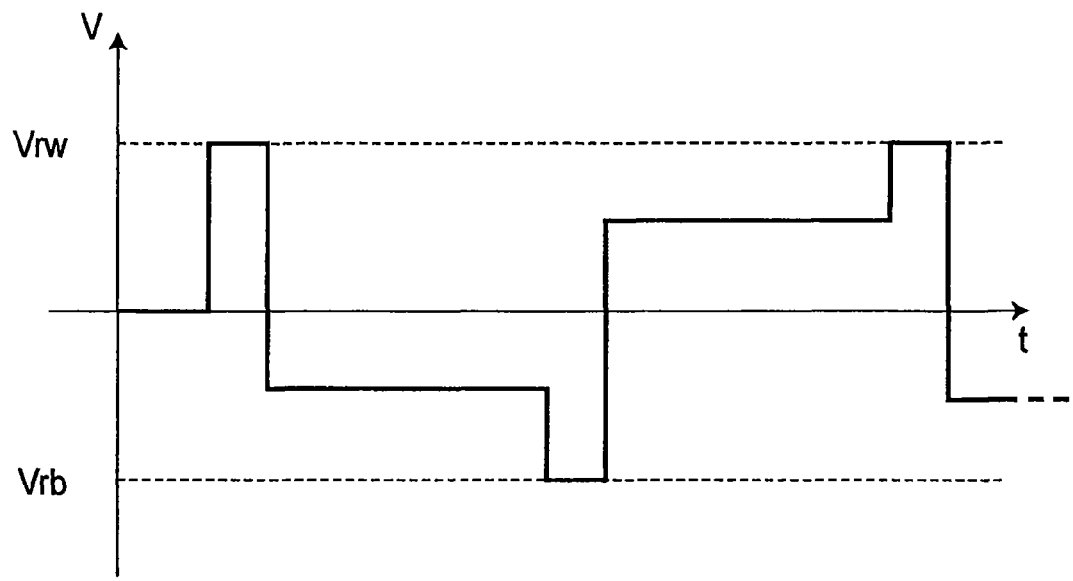
FIG. 4 is a time chart for illustrating a drive sequence for effecting bipolar reset.

FIG. 4 is a time chart showing a drive sequence for effecting bipolar reset of the electrophoretic display device of this embodiment. In the case of effecting the bipolar reset, first, a voltage Vrw is applied so as to effect white display reset and then an arbitrary gradation is written. Next, a voltage Vrb is applied so as to effect black display reset and then an arbitrary gradation is written. The voltages Vrw and Vrb have the same amplitude but have opposite polarities. By effecting opposite-polarity resets alternately, it is possible to perform such a drive that a residual DC is less liable to accumulate. As a result, it is possible to perform stable display rewriting which is less liable to cause burn-in.

As described above, by providing the first electrode 4 and the second electrode 5 with the same area, it becomes possible to equalize the electric field strength exerted on the electrophoretic particles in writing from white display reset to that in writing from black display reset. As a result, it is possible to perform bipolar-voltage drive using positive and negative voltages (of both polarities). Further, even in the case of repeating display rewriting, it becomes possible to perform such a drive that the respective electrodes are alternately supplied with voltages of opposite polarities, so that accumulation of the residual DC component can be remarkably alleviated compared with a conventional monopolar-voltage drive and it is possible to remedy the burn-in problem.

Incidentally, there is substantially no problem even when the areas of the first and second electrodes 4 and 5 are not strictly equal to each other but substantially equal to each other so long as an optical characteristic in writing from white display reset with a predetermined gradation accuracy is identical to that in writing from black display reset with the predetermined gradation accuracy.

Second Embodiment

Figure 5:
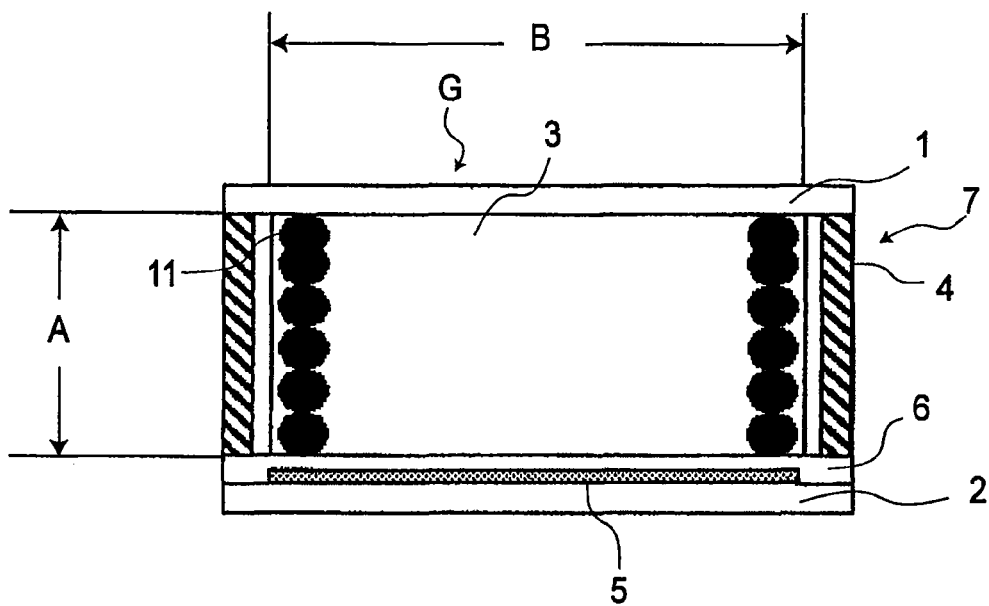
FIG. 5 is a sectional view showing a pixel of an electrophoretic display device according to Second Embodiment of the present invention.

FIG. 5 is a schematic sectional view of a pixel of an electrophoretic display device according to this embodiment, wherein the same reference numerals as in FIG. 1 represent the same or corresponding portions.

In FIG. 5, black electrophoretic particles 11 are contained in an electrophoretic dispersion liquid 3. In this embodiment, a pixel G has a height (A) of 60 μm, a width (B) of 40 μm, and a length or depth (C) of 60 μm (FIG. 1). In other words, in this embodiment, a length in a height direction of the pixel G is longer than a length in a width direction.

Figure 10:
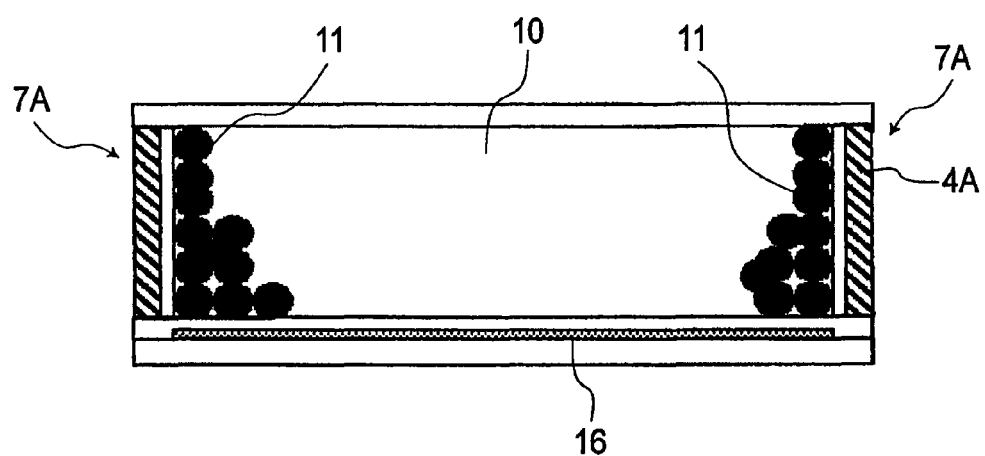
FIG. 10 is a sectional view showing a state at the time of white display reset in a conventional horizontal movement-type electrophoretic display device.

Here, in the conventional electrophoretic display device, as described with reference to FIG. 10, the electrophoretic particles 11 are deposited in the plural layers on a cell deposition surface at the time of white display reset and the particle deposition state is charged by the slight change in electric field strength, thus resulting in a problem of unstable optical response characteristic.

On the other hand, in the electrophoretic display device of this embodiment, the electrophoretic particles 11 at the time of white display reset are deposited in a single layer on the cell deposition surface as shown in FIG. 5 because of the larger height (A) of the pixel G.

When the electrophoretic particles are preset at the electrode surface in such a state that they are deposited in the plurality of layers, electrophoretic particles directly contacting the electrode have a strong deposition force but electrophoretic particles located at an upper portion of the plurality of layers thereof have a weak deposition force, thus being suspended in the dispersion liquid by a slight oscillation or shaking. In the conventional electrophoretic display device, one of the causes of an unstable collected state of electrophoretic particles on the partition wall compared with an extended state of electrophoretic particles on the substrate may be attributable to the deposition state of electrophoretic particles in the plural layers.

On the other hand, in such a deposition state of electrophoretic particles that the electrophoretic particles are deposited on the second electrode in the single layer, i.e., without being overlies, the particle deposition state is table and is less liable to be changed by the slight change in electric field strength, so that the optical characteristic of the electrophoretic display device is not largely changed by a slight change in applied voltage. Accordingly, compared with the conventional electrophoretic display device, the electrophoretic display device of this embodiment can stabilize an optical gradation level in writing from white display reset and improve a controllability in gradation writing from the white display reset.

As described above, by providing the first electrode 4 with an area which is larger than an area of the second electrode 5, the electrophoretic particles 11 are placed in such a deposition state that they are deposited in the single layer in white display reset. As a result, it is possible to improve a gradation controllability in writing from the white display reset.

Incidentally, when the first electrode 4 is provided with an excessively large area, a height of the partition wall 7 for partitioning adjacent pixels is also increased. As a result, a production process becomes difficult and there arise problems of lowering in light reflectance, viewing angle, etc. For these reasons, the area of the first electrode 4 may preferably be not more than approximately three times the area of the second electrode 5.

Third Embodiment

Figure 6:
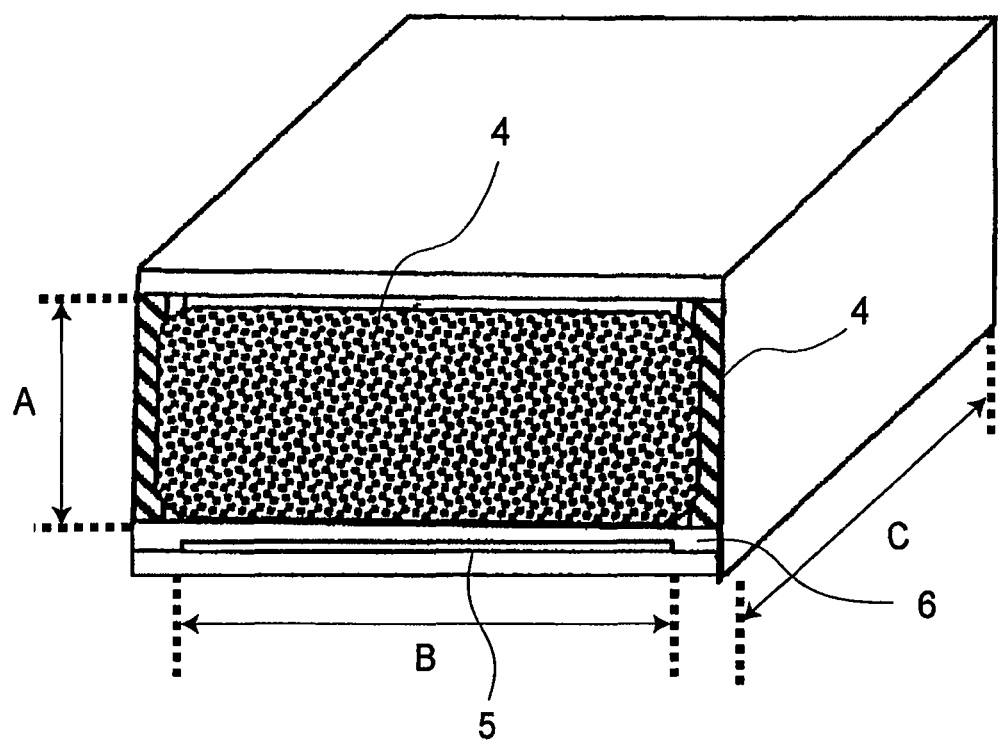
FIG. 6 is a perspective view showing a pixel of an electrophoretic display device according to Third Embodiment of the present invention.

FIG. 6 is a schematic perspective view of a pixel of an electrophoretic display device according to this embodiment, wherein the same reference numerals as in FIG. 5 represent the same or corresponding portions.

In FIG. 6, a pixel G has a height (A) of 10 μm, a width (B) of 40 μm, and a length or depth (C) of 40 μm, and four side surfaces and a bottom surface of the pixel G are coated with electrodes. More specifically, in this embodiment, at four side surfaces (including two pairs of opposite surfaces), the first electrode 4 is disposed.

Here, in such a electrophoretic display device, as described above, even when the first and second electrodes 4 and 5 are provided with the same area, electric field strengths at points on the first and second electrodes 4 and 5 which have the same distance from a contact line (edge) between the first and second electrodes 4 and 5 are not accurately equal to each other. For this reason, in this embodiment, by adjusting a thickness of the insulating layer 6, the electric field strengths at the points on the first and second electrodes 4 and 5 which have the same distance from the contact line are made equal to each other.

Figure 7:
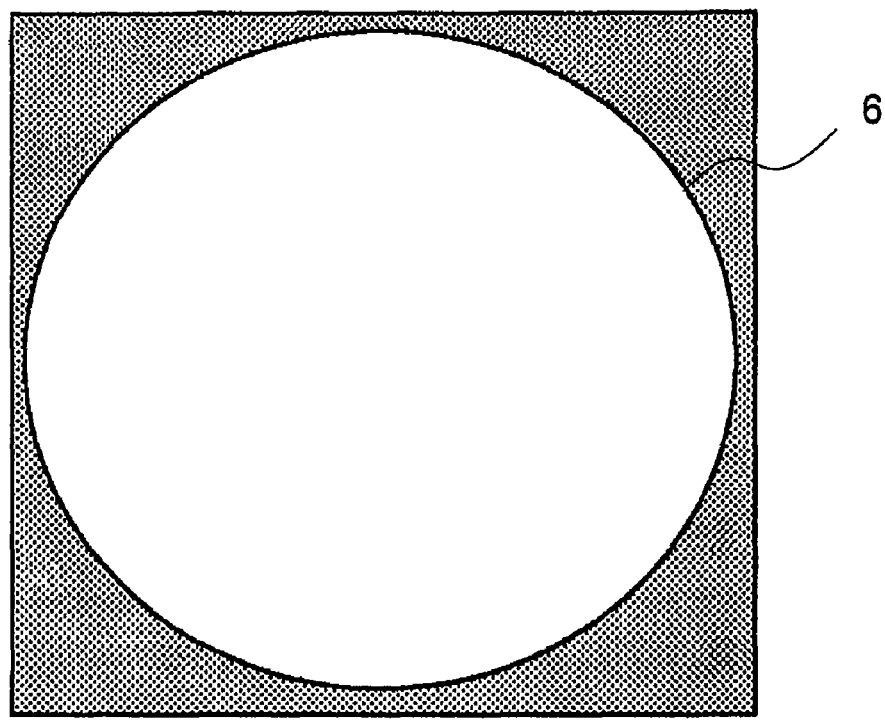
FIG. 7 is a top view of the pixel of the electrophoretic display device shown in FIG. 6.

For example, as shown in FIG. 7 which is a top view of the pixel G, the thickness of the insulating layer 6 of the second electrode 5 is made larger at four corners of the pixel G where the electric field strength is stronger and made smaller at a pixel center portion where the electric field strength is weaker, whereby it becomes possible to perform bipolar drive at the same drive voltage.

Further, a distance from the first electrode 4 to the surface of the insulating layer 6 thereon and a distance from the surface of the insulating layer 6 thereon are made equal to each other, and when an intersection line is taken as a line of intersection of an extended plane of the first electrode surface and an extended plane of the second electrode surface, a distance from the intersection line to an edge of the first electrode surface closest to the intersection line and a distance from the intersection line to an edge of the second electrode surface closest to the intersection line are made equal to each other. As a result, it is also possible to make the electric field strengths at the points on the first and second electrodes having the same distance from the edge line between the first and second electrodes, equal to each other.

By adjusting so, the electric field strength exerted on the electrophoretic particles is symmetrical with respect to the white display reset and the black display reset. As a result, the optical response characteristic is improved compared with the conventional one, thus resulting in the above described electrooptical characteristic as shown in FIG. 3(a). More specifically, the optical response characteristics in writing from the white display reset and from the black display reset are substantially identical to each other, thus permitting the bipolar reset operation.

By effecting the above described sequence shown in FIG. 4, the opposite-polarity reset can be performed alternately to realize such a drive that the residual DC component is less liable to accumulate. As a result, it is possible to effect stable display rewriting with less occurrence of the burn-in.

Incidentally, in the case where the distance from the first electrode 4 to the insulating layer 6 surface thereon (first distance) and the distance from the second electrode 5 to the insulating layer 6 surface thereon (second distance) cannot be made equal, when these first and second distances satisfy the relationship of: (first distance)>(second distance), it becomes possible to effect the bipolar drive at the same drive voltage (amplitude) by satisfying the relationship: (electrode area of first electrode 4)<(electrode area of second electrode 5).

On the other hand, when the first and second distances satisfy the relationship of: (first distance)<(second distance), it becomes possible to effect the bipolar drive at the same drive voltage (amplitude) by satisfying the following relationship: (electrode area of first electrode 4)>(electrode area of second electrode 5).

Fourth Embodiment

Each of FIGS. 8(a) and 8(b) is a schematic perspective view of a pixel of an electrophoretic display device according to this embodiment, wherein the same reference numerals as in FIG. 1 represent the same or corresponding portions.

In FIGS. 8(a) and 8(b), a side surface electrode 8 for preventing an electric field generated by a first electrode 4 and a second electrode 5 from adversely affecting adjacent pixels is disposed at opposite two side surfaces of four side surfaces of a pixel G.

More specifically, in this embodiment, of the four side surfaces of the pixel G, the side surface electrode 8 is disposed at opposite two side surfaces and the first electrode 4 is disposed at other opposite two side surfaces. These four side surfaces and a bottom surface of the pixel G are coated with electrodes (the first and side surface electrodes 4 and 8 and the second electrode 5).

Figure 8:
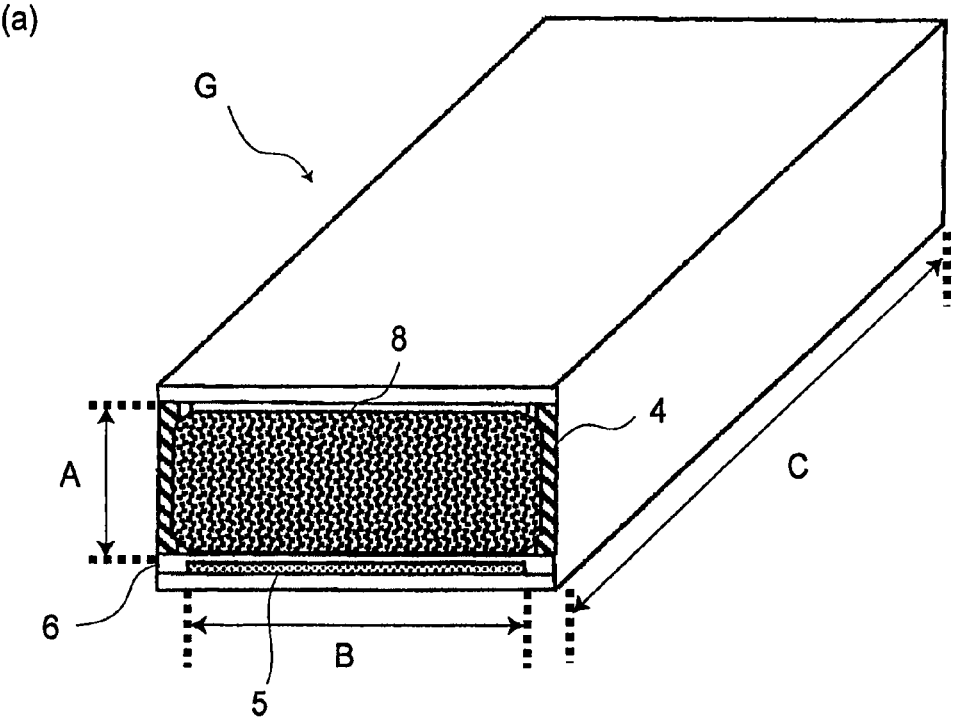
FIGS. 8(*a*) and 8(*b*) are perspective view each showing pixel(s) of an electrophoretic display device according to Fourth Embodiment of the present invention.
Figure 8:
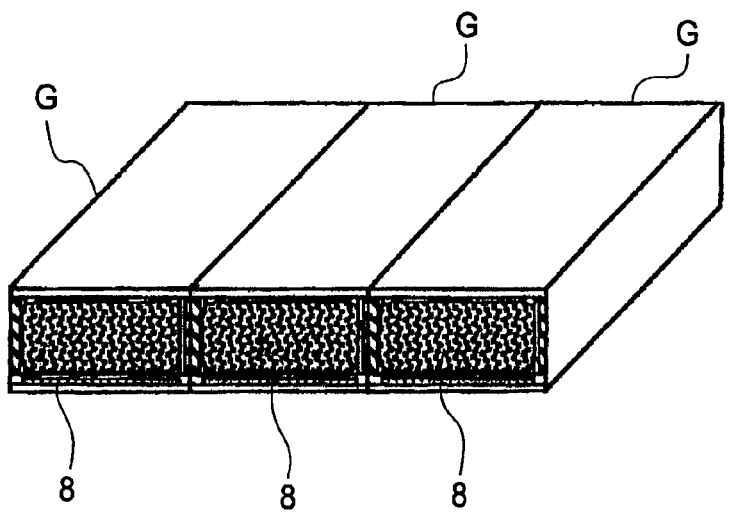
Figure 9:
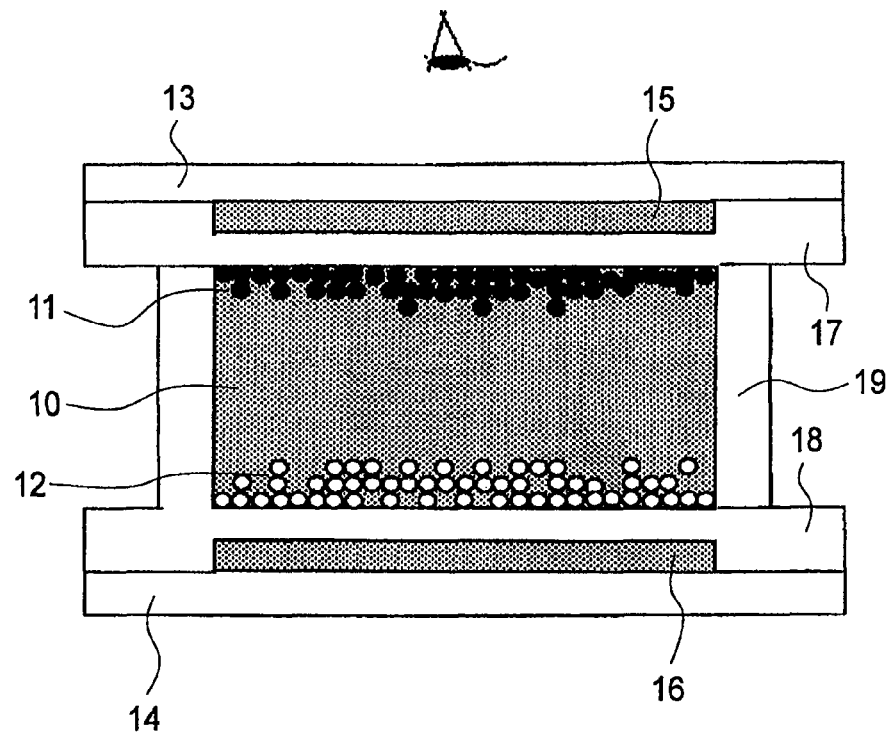
FIG. 9 is a sectional view showing an embodiment of a structure of a conventional electrophoretic display device.

In this embodiment, the pixel G has a height (A) of 20 μm, a width (B) of 40 μm, and a length (depth) (C) of 60 μm as shown in FIG. 8(*a*), so that an areal ratio between the side surface electrode 8 and the first electrode 4 is 2:3.

When three pixels G, each having the size shown in FIG. 8(*a*), capable of displaying red, green and blue are arranged as shown in FIG. 8(*b*), the influence of the side surface electrodes 8 can be reduced. As a result, it becomes possible to perform drive of the electrophoretic display device only by the first electrode 4.

Incidentally, by making the length (depth) (C) of the pixel G longer, i.e., making the B:C ratio being not less than 1:3, an electrode area of the first electrode 4 is not less than three times that of the side surface electrode 8. As a result, the first electrode 4 is dominant with respect to determination of a distribution of electric field in the pixel G, so that the influence of the side surface electrode 8 in drive of the electrophoretic display device is further reduced.

In the above describe embodiments, the first electrode 4 has a substantially rectangular shape but may be a substantially triangular shape or a substantially polygonal shape.

INDUSTRIAL APPLICABILITY

As described hereinabove, according to the present invention, it is possible to provide a practical electrophoretic display device wherein the first electrode disposed at a side surface of the closed space and the second electrode disposed at a bottom surface of the closed space have the substantially same area, whereby it becomes possible to perform such a drive that an opposite polarity voltage is alternately applied between the respective electrodes even in the case of repetitively performing display rewriting, thus alleviating remarkably the accumulation of the residual DC component. Further, by providing the first electrode with a larger area than that of the second electrode, it is possible to stabilize an optical gradation level in writing from white display reset in the electrophoretic display device.

While the invention has been described with reference to the structures disclosed herein, it is not confined to the details set forth and this application is intended to cover such modifications or changes as may come within the purpose of the improvements or the scope of the following claims.

The invention claimed is:

1. An electrophoretic display device, comprising:
   a first substrate and a second substrate which are disposed with a spacing therebetween,
   a partition wall disposed in the spacing to define a closed space between the first and second substrates,
   a plurality of first electrodes, having electrode surfaces along the partition wall, disposed on the partition wall at two opposite sides of the closed space,
   a second electrode, having an electrode surface along the second substrate, disposed on the second substrate, and
   electrophoretic particles and dispersion liquid disposed in the closed space, the electrophoretic particles moving onto the plurality of first electrodes by a first voltage application between the first and second electrodes and moving onto the second electrode by a second voltage application of an opposite polarity to the first voltage application between the first and second electrodes,
   wherein an electrode surface area of the plurality of first electrodes is substantially equal to an electrode surface area of the second electrode.

2. An electrophoretic display device according to claim 1, wherein the plurality of first electrodes are a pair of first electrodes,
   wherein the first electrodes and the second electrode are rectangular in shape, and
   wherein a side of the first electrodes and a side of the second electrode are equal in length to each other, and a ratio of another side of the first electrodes and another side of the second electrode is 1:2.

3. An electrophoretic display device according to claim 1, wherein in each of the electrode surface areas of the plurality of first electrodes and the electrode surface area of the second electrode, the electrophoretic particles are capable of being deposited in a single layer.

4. An electrophoretic display device, comprising:
   a first substrate and a second substrate which are disposed with a spacing therebetween;
   a partition wall disposed in the spacing to define a closed space between said first and second substrates;
   a plurality of first electrodes disposed on the partition wall at two opposite sides of the closed space so that electrode surfaces of the plurality of first electrodes are along the partition wall;
   a second electrode disposed on the second substrate so that an electrode surface of the second electrode is along the second substrate; and
   electrophoretic particles and dispersion liquid disposed in the closed space,
   where an electrode surface area of the plurality of first electrodes is substantially equal to an electrode surface area of the second electrode, and
   wherein in each of the electrode surface area of the plurality of first electrodes and the electrode surface area of the second electrode, the electrophoretic particles are capable of being deposited in a single layer.

* * * * *